United States Patent
Wivagg (10) Patent No.: US 6,305,651 B1
(45) Date of Patent: Oct. 23, 2001

(54) RETAINING APPARATUS AND METHOD FOR USE IN A NUCLEAR REACTOR

(75) Inventor: Adrian P. Wivagg, Tolland, CT (US)

(73) Assignee: Westinghouse Electric Company LLC, Pittsburgh, PA (US)

(*) Notice: Subject to any disclaimer, the term of this patent is extended or adjusted under 35 U.S.C. 154(b) by 0 days.

(21) Appl. No.: 09/498,736

(22) Filed: Feb. 7, 2000

(51) Int. Cl.⁷ ........................................... F16L 3/00
(52) U.S. Cl. ................................................. 248/73
(58) Field of Search ........................ 248/73, 65, 74.1, 248/74.4

(56) References Cited

U.S. PATENT DOCUMENTS

| | | |
|---|---|---|
| 4,479,625 * 10/1984 | Martz | 248/74.1 |
| 5,737,380 4/1998 | Deaver et al. | |
| 5,833,179 * 11/1998 | Vandenberg | 248/65 |
| 5,839,703 * 11/1998 | Tesar | 248/65 |

* cited by examiner

Primary Examiner—Ramon O Ramirez (57) ABSTRACT

A bracket (48) for mounting a pipe (20) to a wall (22) in a nuclear reactor, having a first flange (54) and a second flange (56) adapted to slideably engage grooves (40) in studs (26) and (28) that are connected to wall (22), and a first fastener (74) adjacent the first flange (54) and a second fastener (76) adjacent the second flange (56), the fasteners (74) and (76) being moveable to a closed position wherein they retain the bracket (48) on the studs (26) and (28) when the bracket is in the installed condition, and methods for using the bracket (48) to replace an installed pipe (20) and to install a new pipe (20).

17 Claims, 5 Drawing Sheets

RETAINING APPARATUS AND METHOD FOR USE IN A NUCLEAR REACTOR

FIELD OF THE INVENTION

This invention relates generally to retaining apparatus and methods and more particularly to apparatus and methods for mounting core spray lines to a wall in the nuclear reactor.

BACKGROUND

The boiling water reactor industry has experienced extensive cracking of internal reactor components. The core spray line piping system is of particular interest as the pipe joints provide many possible leak paths.

In a typical core spray line, the piping enters the vessel through a safe end above the shroud and immediately goes into a T-section that divides the flow into two pipes. It will be appreciated that a safe end as used herein refers to a coupling pipe used to create a fluid path between two pipes fabricated of dissimilar metals. The coupling pipe is constructed of a material compatible with the pipe sections to be joined.

Within the core spray piping system, each pipe curves around the interior of the vessel until it reaches a downcomer, with one or more supports along the path. The downcomer extends down to the shroud where it enters through another safe end and terminates in a T-section located in the sparger at the top of the shroud.

There are two piping systems per unit that serve four half circle spray spargers in the shroud. In existing systems, the joints are typically welded and subject to cracking, thus creating a leak path for the fluids retained by the pipes.

If cracks are found in the core spray line, it may be more advantageous to replace the cracked pipe than to leave the pipe in place and attempt repairs of the cracks. The restraining devices or supports that fix the pipe into position within the nuclear reactor must be removed in order to remove the pipes.

Figure 1:
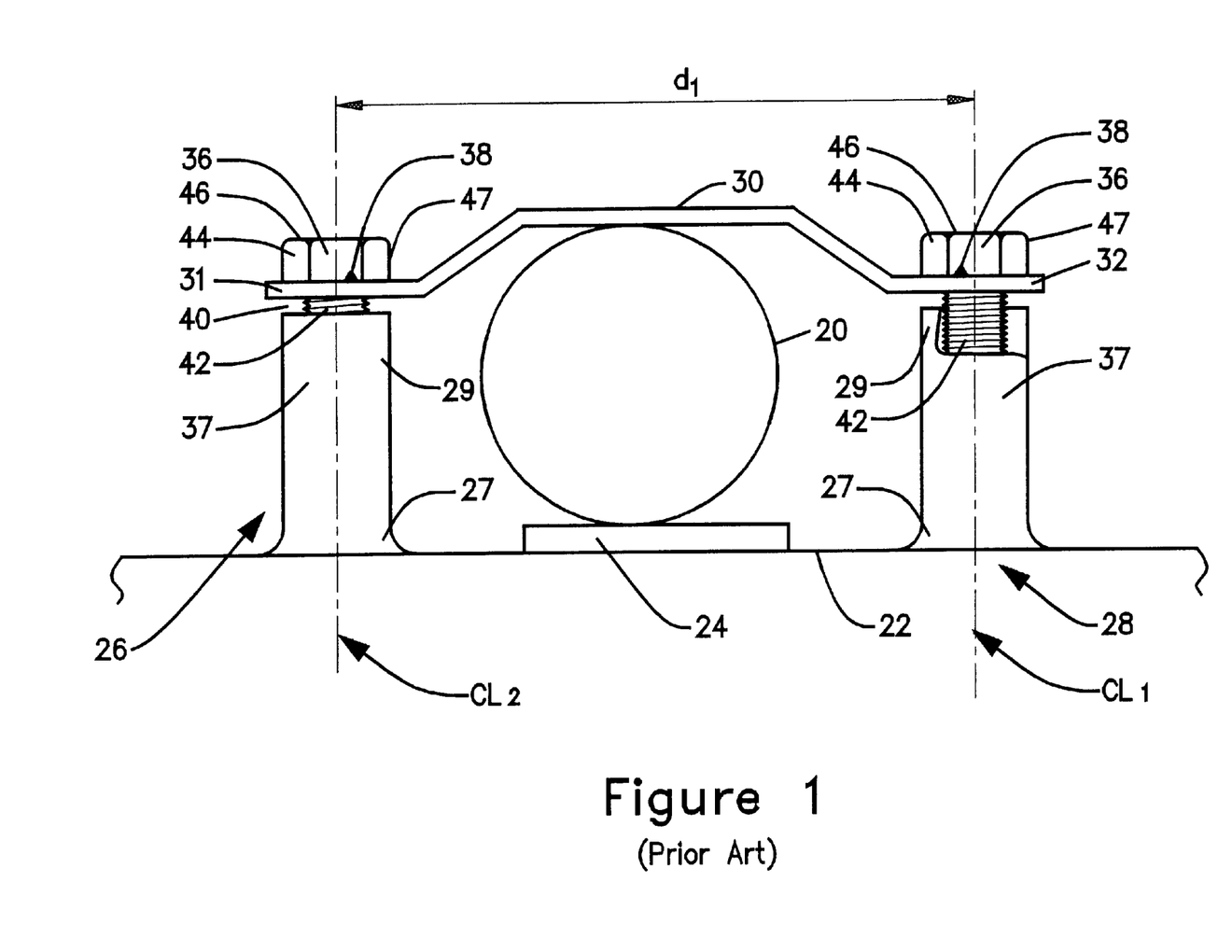
FIG. 1 is a front elevation view of an apparatus known in the prior art for securing a pipe to a wall in a nuclear reactor.

FIG. 1 shows apparatus known in the prior art for securing a core spray pipe (20) adjacent a wall (22) within a nuclear reactor. The pipe (20) is positioned adjacent a pad (24) mounted to the wall (22) and is positioned between studs (26) and (28). Studs (26) and (28) are typically identical, and consequently the description herein of either one of the studs can be applied to the other stud. The studs include a proximate end (27) connected to wall (22) and a distal end (29), and are spaced from each other a lateral distance (d1) as measured between parallel centerlines (CL1) and (CL2). The pipe (20) is held in place adjacent the pad (24) by restraining bar (30). The distal end (29) of studs (26) and (28) include bolts (36) that extend through bar ends (31) and (32) into a threaded hole in a boss (37). The bolts (36) include a shank (42) and head (44), with the head's outermost dimensional envelope defined by the width of bolt face (46) and the height of the bolt corner (47).

In one arrangement, the bolts (36) are screwed into bosses (37) far enough to bring restraining bar (30) into contact with pipe (20). However, the bolts are not screwed in far enough to close the gaps or grooves (40) between bar ends (31) and (32) and bosses (37). Consequently, the restraining bar (30) is in position to hold pipe (20) adjacent wall (22), but does not press against the pipe so firmly that it prevents the pipe's movement in the lateral direction or along the pipes longitudinal axis. Moreover, if desired, a slight gap (not shown) can be provided between pipe (20) and pad (24) and or between pipe (20) and restraining bar (30), to allow pipe (20) some capability of movement back and forth between the pad (24) and restraining bar (30). Thus, this arrangement allows the pipe (20) to move in response to expansions and contractions of the pipe that can be expected as a result of varying temperature cycles.

After the bolts (36) are positioned as desired, tack welds (38) are used to secure the bolts to the restraining bar (30). In some cases, weld material will overflow (not shown) into gap or grooves (40) and bond the restraining bar (30) to the bosses (37), so that the bolts (36), restraining bar (30), and bosses (37) are welded together as a single unit.

In order to remove the core spray pipe (20) from the nuclear reactor, the restraining bar (30) must be removed, which ordinarily requires removal of bolts (36). Since these bolts are welded in place, they must be removed by a process that overcomes the weld without damaging the studs. The shank (42) of the bolt may remain welded in place even if it is cut flush with the boss (37), requiring a tedious and time consuming process for removal without damaging the threaded holes in the studs into which new bolts must be placed. If the threaded holes are damaged during the removal process, the time and expense involved in removing and reinstalling the restraining bar (30) will become even more complicated, expensive, and time consuming. The problems associated with the foregoing difficulties an further aggravated by the facts that the restraining bracket may be located underwater, and in an area where it is preferable to reduce work exposure time.

From the foregoing, it is seen that a need exists for a new type of restraining bracket, and a method for its installation, that provides a means for securing a core spray pipe to a wall in a nuclear reactor and which can reduce the time and cost involved with replacing core spray pipes or damaged restraining bars.

SUMMARY

According to one aspect of the invention, apparatus is provided for retaining a pipe against a wall in a nuclear reactor, wherein the wall has a first and a second stud in fixed spatial relationship and the pipe is positioned between the studs and adjacent the wall. Each stud has a proximate end connected to the wall, and each stud has a distal end, with a groove adjacent each of the distal ends.

The bracket comprises a first end and an oppositely disposed second end, a front surface and an oppositely disposed rear surface, and an outer surface oppositely disposed a first flange and a second flange. The first flange is adjacent the inner surface and also adjacent the first end, and extends from the front surface towards the rear surface, and is adapted to slideably engage the groove in the first stud. The second flange is adjacent the inner surface and also adjacent the second end, and extends from the front surface towards the rear surface, and is adapted to slideably engage the groove in the second stud. A pipe bearing surface is disposed between the first and the second flanges. When the bracket is installed onto the studs the first flange engages the first groove, the second flange engages the second groove, and the pipe bearing surface contacts the pipe to retain the pipe adjacent the wall.

According to another aspect of the invention, the first flange is adapted to position the first stud away from the front surface when the bracket is in the installed condition, and the second flange is adapted to position the second stud away from the front surface when the bracket is in the installed condition. A first fastener is adjacent the first end and is movable between a first open position and a first closed position. In the first closed position, the first fastener is disposed between the first stud and the front surface when the bracket is in the installed condition. A second fastener is adjacent the second end and is movable between a second open position and a second closed position. In the second closed position, the second fastener is disposed between the second stud and the front surface when the bracket is in the installed condition.

According to another aspect of the invention, the first and second fasteners are locking fasteners.

According to another aspect of the invention, the first fastener comprises a moveable first threaded rod, and the second fastener comprises a moveable second threaded rod.

According to another aspect of the invention, the bracket includes a pipe cavity.

According to another aspect of the invention, the first flange comprises a first slot, and the second flange comprises a second slot.

According to another aspect of the invention, a method is provided for retaining a pipe against a wall, wherein the wall has a first stud and a second stud in a fixed spacial relationship, and the first stud and the second stud each have a respective proximate end connected to the wall, and the first stud and the second stud each have a respective distal end, with a first groove positioned adjacent the distal end of the first stud, and a second groove positioned adjacent the distal end of the second stud; comprising the steps of;

provi­ding a pipe and placing a length of the pipe adjacent the wall between the first and the second studs;

providing a bracket having:
a first end and an oppositely disposed second end, a front surface and an oppositely disposed rear surface, and an outer surface oppositely disposed a first flange and a second flange;
the first flange adjacent said first end, extending from said front surface towards said rear surface, adapted to slideably engage the first groove;
the second flange adjacent said second end, extending from said front surface towards said rear surface, adapted to slideably engage the second groove;
a pipe bearing surface disposed between the first flange and the second flange;

positioning the bracket with the first flange aligned with the first groove, the second flange aligned with the second groove, and the pipe bearing surface adjacent the pipe; and moving the bracket to an installed position wherein the first flange engages the first groove and the second flange engages the second groove, and the pipe bearing surface is adjacent the pipe.

According to another aspect of the invention a method is provided comprising the steps of:

providing a first moveable fastener adjacent the first end, the fastener being in a first open position and moveable to a first closed position, and a second moveable fastener adjacent the second end, the second fastener being in a second open position and moveable to a second closed position; and after the bracket is in the installed position, moving the first fastener to the first closed position, wherein the first fastener is disposed between the first stud and the outer surface, and moving the second fastener to the second closed position, wherein the second fastener is disposed between the second stud and the outer surface.

According to another aspect of the invention, a method is provided comprising the further step of providing a locking first fastener and a locking second fastener.

According to another aspect of the invention a method is provided comprising the step of locking the first fastener in the first closed position and locking the second fastener in the second closed position.

According to another aspect of the invention, a method is provided for replacing a pipe retained against a wall, wherein the pipe is adjacent the wall between a first stud and a second stud, the first stud and the second stud each have a respective proximate end connected to the wall, the first stud and the second stud each have a respective distal end, with a first groove positioned adjacent the distal end of the first stud, and a second groove positioned adjacent the distal end of the second stud, and a restraining bar is connected to the first stud and the second stud to retain the pipe adjacent the wall, comprising the steps of;

cutting the restraining bar adjacent the first stud and adjacent the second stud, and removing the cut portion of the restraining bracket and pipe;

providing a second pipe and placing a length of the second pipe adjacent the wall between the first and the second studs;

providing a bracket having:
a first end and an oppositely disposed second end, a front surface and an oppositely disposed rear surface, and an outer surface oppositely disposed a first flange and a second flange;
the first flange adjacent the first end, extending from the front surface towards the rear surface, adapted to slideably engage the first groove;
the second flange adjacent the second end, extending from the front surface towards the rear surface, adapted to slideably engage the second groove;
a pipe bearing surface disposed between the first flange and the second flange;

positioning the bracket with the first flange aligned with the first groove, the second flange aligned with the second groove, and the pipe bearing surface adjacent the pipe; and moving the bracket to an installed position wherein the first flange engages the first groove and the second flange engages the second groove, and the pipe bearing surface is adjacent the pipe.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 2:
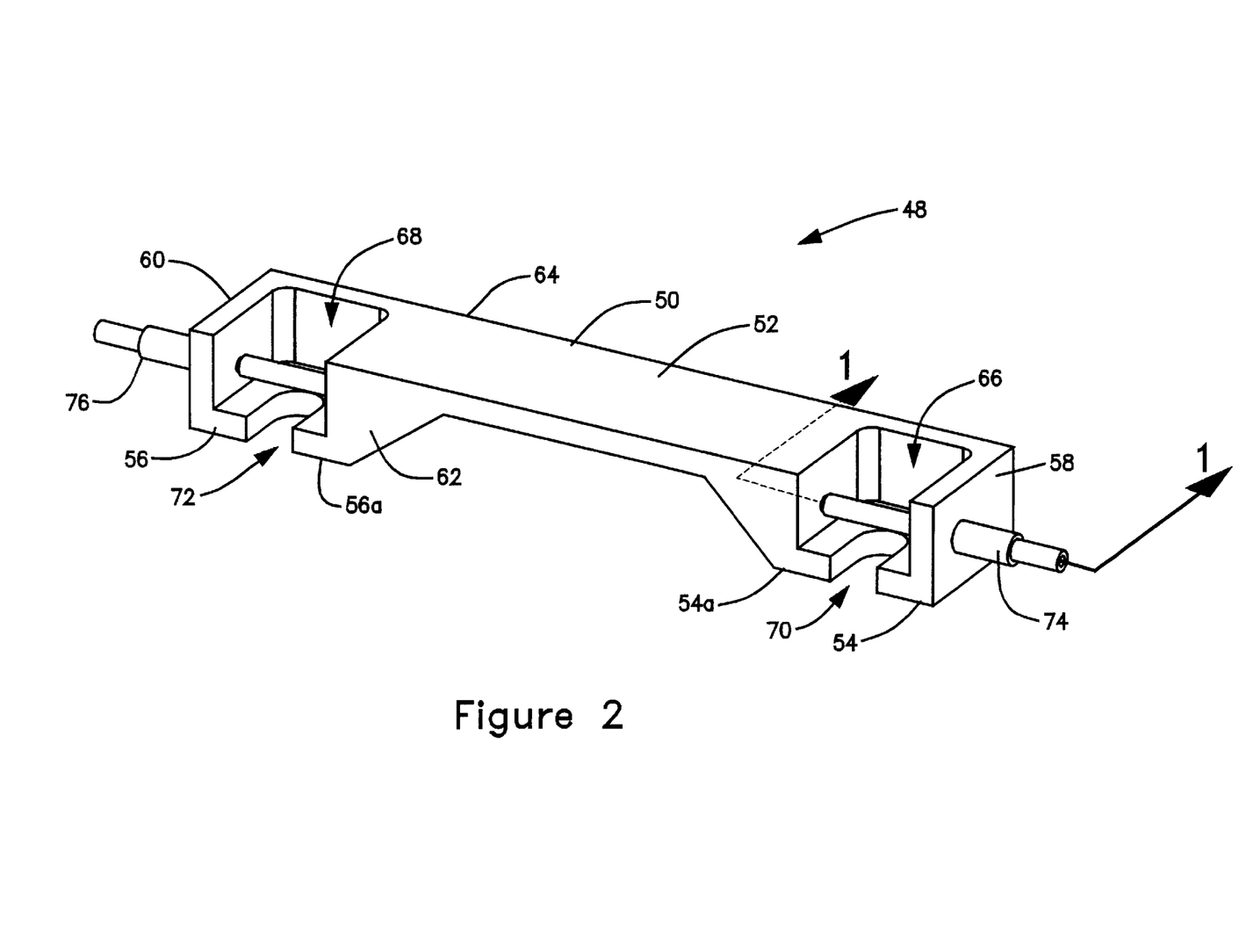
FIG. 2 is a perspective view of a bracket embodying features of the present invention.

FIG. 2 is a perspective view of a bracket (48) embodying features of the present invention. The bracket can be adapted for installation onto the studs (26) and (28) that are shown in FIG. 1, or devices with similar geometries, in both replacing existing core spray lines and the installation of new core spray lines. The bracket comprises a clamp (50) having an outer surface (52) oppositely disposed a first flange (54) and a second flange (56), which have lower flange surfaces (54a) and (56a), respectively; a first end (58) and an oppositely disposed second end (60); and a front surface (62) and an oppositely disposed rear surface (64).

The clamp (50) includes a first cavity (66) adjacent the first end (58) and a second cavity (68) adjacent second end (60). First flange (54) includes a first slot (70) and second flange (56) includes a second slot (72). A first moveable fastener (74) such as a crimp cup with a threaded rod or the like is mounted in the first end (58), and a second moveable fastener (76) such as a crimp cup with a threaded rod or the like is mounted in the second end (60). The first fastener (74) and second fastener (76) are shown in first and second closed positions, respectively. The fasteners are moveable to first and second open positions, respectively, which are described in greater detail with respect to FIG. 4. As will be explained in greater detail with respect to FIG. 3, the cavities, slots, and fasteners can be sized and positioned to mate with the studs (26) and (28) as shown in FIG. 1, or with equivalent devices that have similar geometries.

Figure 3:
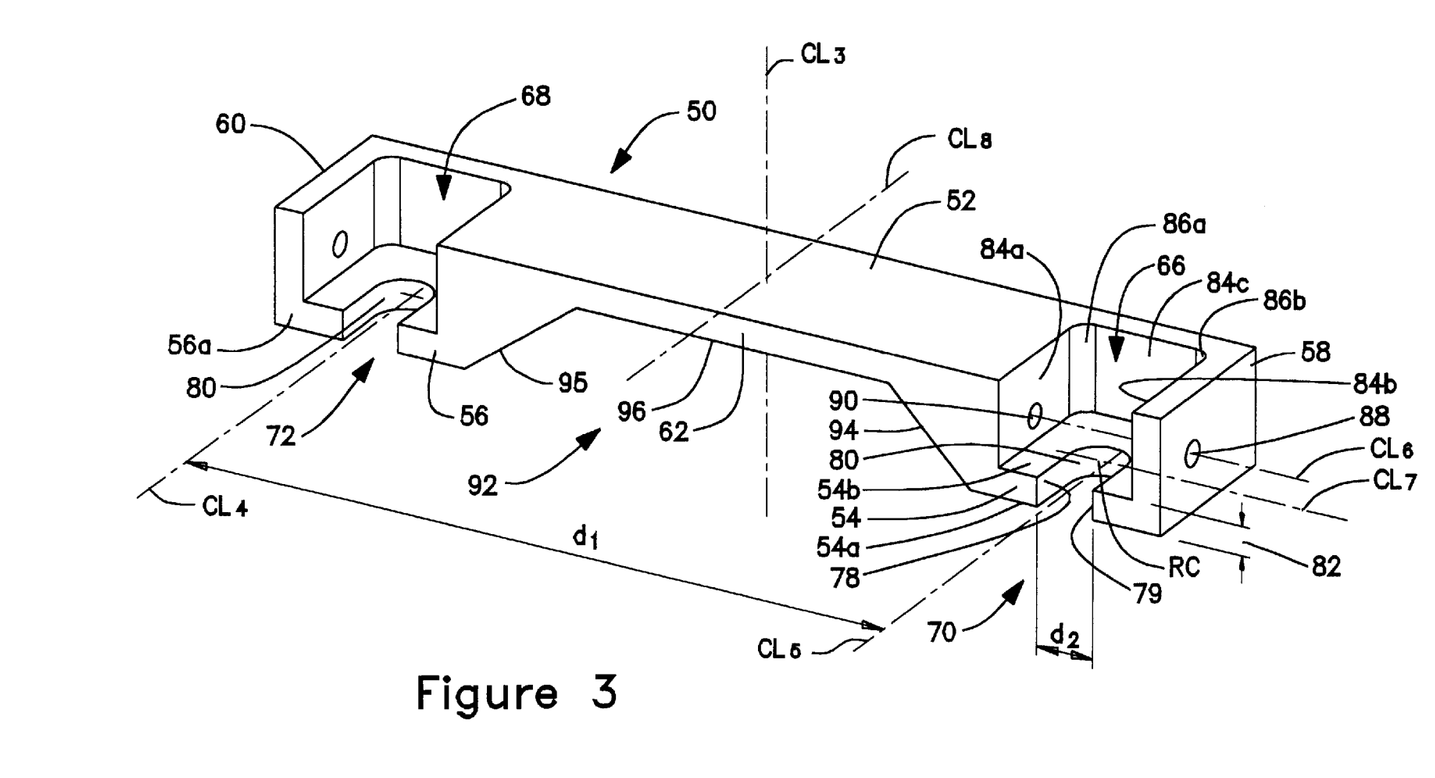
FIG. 3 is a perspective view of a clamp embodying features of the present invention.

FIG. 3 shows the construction of a clamp (50) embodying elements of the present invention in greater detail. The clamp preferably comprises a unitary construction and is formed by machining its various features in a solid piece of, preferably, stainless steel. One skilled in the art will recognize that other fabrication techniques can be used to fabricate the clamp, such as for example, casting techniques and sheet metal bending. The clamp is preferably symmetrical about the plane defined by centerlines (CL3) and (CL8), and, the features of clamp (50) on opposite sides of these centerlines are typically the same except for the fact that they are mirror images of each other. Consequently, the description herein pertaining to features on one side of these centerlines can apply to the corresponding mirror image features on the opposite side of these centerlines.

Slots (70) and (72) are positioned on and oriented lengthwise in the direction of centerlines (CL4) and (CL5), which are parallel and spaced from each other a lateral distance (d1). As shown with respect to slot (70), the slots have side walls (78) and (79) that extend from the front surface (62) to a curved wall (80). The side walls (78) and (79) are spaced from each other a distance (d2) sufficient to slideably receive a bolt shank (42) (as shown in FIG. 1), and the curved wall (80) is adapted to receive and bear against the shank. As shown with respect to flange (54), lower flange surface (54a) is spaced from upper flange surface (54b) by a flange thickness (82). The flange thickness can be varied as desired to slideably engage the groove (40) on studs (26) and (28). As previously noted, flange (56) has the same mirror image construction. One skilled in the art will recognize that other embodiments of flanges (56) and (58) can be utilized to slideably engage the groove (40). For example, a suitable flange (54) might only include side wall (78) and portions of curved wall (80).

First cavity (66) is adjacent the first end (58) of clamp (50). The first cavity includes upper surface (54b); side walls (84a) and (84b); back wall (84c); and corner walls (86a) and (86b). Second cavity (68) is adjacent second end (60) of clamp (50), and as previously noted, is a mirror image of first cavity (66). The first and second cavities (66) and (68) can accommodate bolt heads (44) when the bracket (48) is installed onto the studs (26) and (28).

As shown with respect to first cavity (66), the upper flange surface (54b) forms the lowest portion of first cavity (66), and can be located a sufficient distance from outer surface (52) to ensure that the height of the bolt head (44) as defined by bolt corner (47) can lie entirely or at least partially within first cavity (66). First cavity side walls (84a) and (84b), and corner walls (86a) and (86b), are oriented with respect to each other and are spaced from each other sufficiently to accommodate the bolt head width as defined by bolt face (46). Back wall (84c) and corner walls (86a) and (86b) are oriented and spaced with respect to each other and curved wall (80) sufficiently to receive and accommodate the bolt head (44) when the bolt shank (42) is bearing against curved wall (80), without having the bolt head interfere with side walls (84a) and (84b), back wall (86c), and corner walls (86a) and (86b).

First fastener mounting hole (88) is at first end (58) and is located on centerline (CL6). First fastener seating hole (90) is at side wall (84a) on the same centerline. Centerline (CL6) is closer to front surface (62) than the centerline (CL7), which extends through the radial center (RC) of curved wall (80). (RC) is positioned such that the curved wall (80) on flanges (54) and (56) will position the first and second studs (26) and (28) away from the front surface (62) when the bracket is in the installed condition. The relative locations of centerlines (CL6) and (CL7), and (RC) can be selected to ensure that the first fastener (74), when in the closed position shown in FIG. 2, will lie between a bolt head (44) that is fully installed in first cavity (66) and front surface (62). Centerline (CL6) is positioned to ensure that at least part of the first fastener (74), when in the closed position, is a distance from upper flange surface (54b) no greater than the bolt head height as measured along bolt corner (47).

Pipe cavity (92) is positioned between the first and the second cavities (66) and (68), respectively. Pipe cavity side walls (94) and (95) extend upward at an angle from lower flange surfaces (54a) and (56a), respectively, to pipe cavity bearing surface (96). The bearing surface (96) is positioned a sufficient distance from lower flange surfaces (54a) and (56a), as measured along the centerline (CL3), to ensure that the bearing surface will accommodate a core spray pipe of a predetermined diameter when the bracket (48) is installed onto studs (26) and (28).

Figure 4:
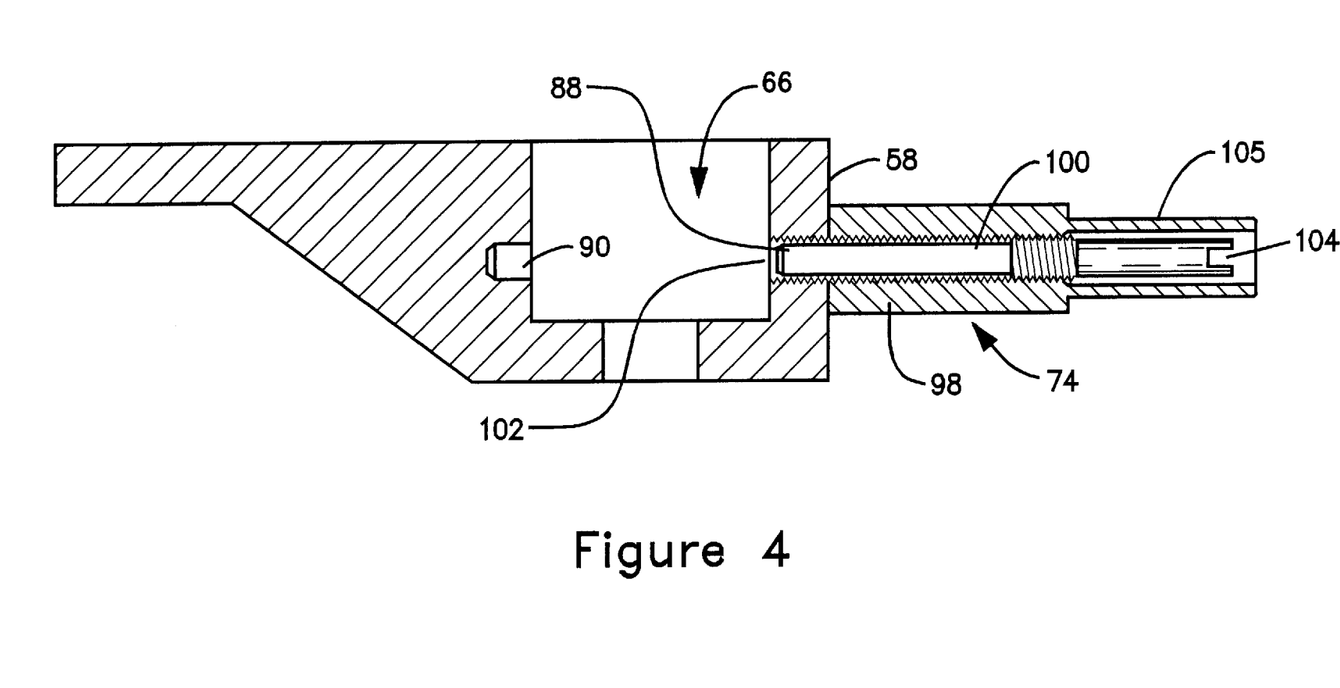
FIG. 4 is a partial sectional view, taken along lines 1—1 in FIG. 3, showing in greater detail a first fastener mounted in a clamp as shown in FIG. 3.

FIG. 4 is a section view taken along lines 1—1 in FIG. 2, and shows an embodiment of a first fastener (74) suitable for use in the invention. Second fastener (76) is preferably of the same construction as the first fastener.

First fastener (74) is shown in the first open position and includes a housing (98) connected to first end (58). A threaded rod (100), shown in an open position, is enclosed within the housing and extends into first fastener mounting hole (88) but not into cavity (66). The threaded rod includes an end portion (102) for mating with seating hole (90). The threaded rod is in alignment with seating hole (90), and can be extended across first cavity (66) and into seating hole (90) by turning the threaded rod (100) at screwdriver slot (104). The threaded rod (100) is in a closed position, as shown in FIG. 2, when end portion (102) is extended across first cavity (66) and mated with seating hole (90). After the threaded rod (100) is in the closed position, a deformable portion (105) can be crimped to retain the threaded rod in the closed position.

The construction of a bracket embodying elements of the present invention having been explained, a method for using the bracket to replace an existing core spray pipe will now be described with reference to FIGS. 5a through 5d.

Figure 5A:
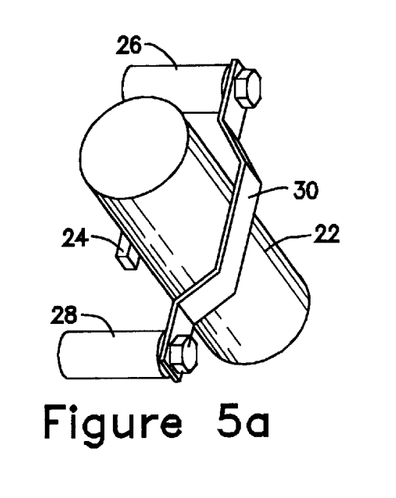
FIGS. 5a–5d are perspective views showing a procedure for removing a prior art restraining bar and installing a bracket embodying features of the present invention.
Figure 5B:
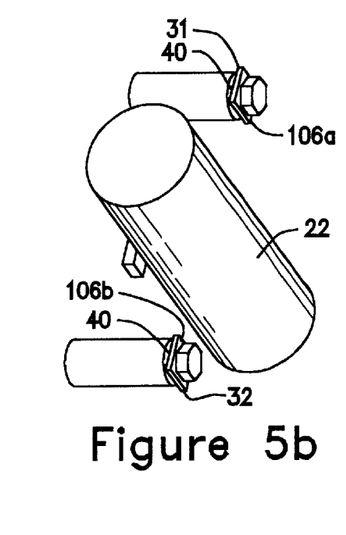

FIG. 5a is a perspective view of a core spray pipe (22) installed in a nuclear reactor using the prior art apparatus of FIG. 1. In order to remove the restraining bar (30), the bar is cut along lines (106a) and (106b) as shown in FIG. 5b. The bar ends (31) and (32) remain in place, and the cut portion of the restraining bar (30), along with pipe (20), is removed. The groove or gap (40) between the bar ends (31), (32) and bosses (37) is examined to determine if any preparation is necessary prior to installing a new core spray pipe and bracket (30). For example, if any overflow weld material (not shown) has filled the gap or groove, the area can be cleaned using, for example, an electron discharge machining (EDM) process to remove the overflow material and provide clean surfaces for accepting the bracket during installation. Moreover, if a gap or groove is not already present on the studs (26) and (28), they can be machined into the stud by removing portions of the boss (37) using an EDM process.

The bracket (48) can be fabricated based on dimensions specified in the blueprint for the restraining bar (30) and studs (26) and (28), direct measurements of these items, and a combination of both techniques.

Figure 5C:
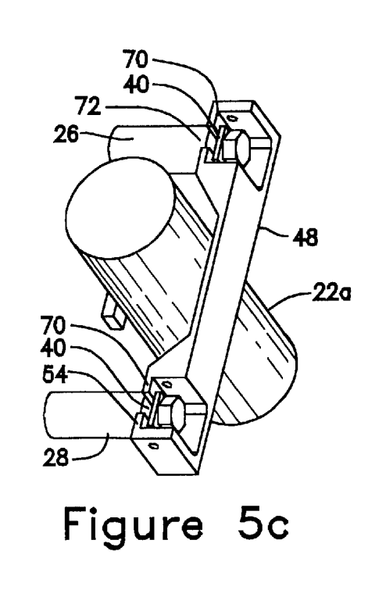
Figure 5D:
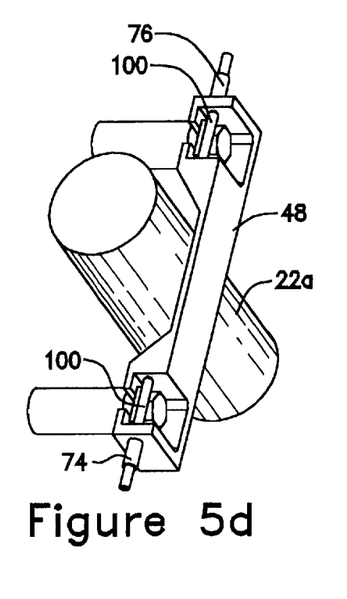

After a new core spray line (22a) is in place as shown in FIG. 5c, bracket (48) is installed onto studs (26) and (28). The bracket (48) is installed by positioning the first and second slots (70) and (72) near the bolt shanks (42) and slideably inserting the first and second flanges (54) and (56) into the grooves (40) at the distal ends. First fasteners (74) and (76) are installed at the first and second ends (58) and (60) with the threaded rods (100) in the open position, and a screwdriver is used to turn the threaded rod (100) until it is in the closed position. With the bracket (48) thus installed, the new core spray pipe (22a) is maintained in its position adjacent the nuclear reactor wall. The bracket (48), while retaining the pipe (22), will accommodate some expansion and contraction of the pipe that can be expected as the pipe is exposed to various thermal conditions.

The method for installing a pipe (20) in a new nuclear reactor using bracket (48) is similar to that described above. In a new reactor, the studs (26) and (28) can have the configuration shown in FIG. 1, or a geometrically equivalent configuration, but a restraining bar (30) is not used to hold the pipe (20) in place against the wall (22). Consequently, the pipe (20) and bracket (48) can be installed without first having to remove restraining bar (30).

Although the invention has been described in detail, with respect to apparatus and method embodying aspects of the invention, it is to be understood that the description is intended by way of illustration and example only, and is not to be taken by way of limitation. Accordingly, the spirit and scope of the invention are to be limited only by the terms at the appended claims.

What is claimed:

1. An apparatus for connecting a pipe to a wall in a nuclear reactor, the wall having a first stud and a second stud in a fixed spatial relationship, the pipe disposed between the first and the second studs and adjacent the wall, the first and the second studs each having a respective proximate end connected to the wall, and the first and the second studs each having a respective distal end, a first groove positioned adjacent the distal end of the first stud, and a second groove positioned adjacent the distal end of the second stud comprising;

a bracket having a first end oppositely disposed a second end, a front surface oppositely disposed a rear surface, and an outer surface oppositely disposed a first flange and a second flange;

said first flange adjacent said first end and extending from said front surface towards said rear surface, adapted to slideably engage the first groove;

said second flange adjacent said second end and extending from said front surface towards said rear surface, adapted to slideably engage the second groove, a pipe bearing surface disposed between said first and said second flanges;

whereby, when said bracket is in an installed condition, said first flange is engaged with the first groove, said second flange is engaged with the second groove, and said pipe bearing surface is adjacent the pipe to retain the pipe adjacent the wall, wherein said first flange is adapted to position the first stud away from said front surface when said bracket is in the installed condition, and said second flange is adapted to position the second stud away from said front surface when said bracket is in the installed condition, and further comprising:

a first fastener adjacent said first end movable between a first open position and a first closed position, wherein, in the first closed position, said first fastener is disposed between the first stud and said front surface when said bracket is in the installed condition; and a second fastener adjacent said second end movable between a second open position and a second closed position, wherein, in the second closed position, said second fastener is disposed between the second stud and said front surface when said bracket is in the installed condition.

2. The apparatus claimed in claim 1, wherein said first flange comprises a first slot and said second flange comprises a second slot.

3. The apparatus claimed in claim 1, wherein said first and said secondfasteners are locking fasteners.

4. The apparatus claimed in claim 3, wherein said first fastener comprises a moveable first threaded rod, and said second fastener comprises a moveable second threaded rod.

5. The apparatus claimed in claim 1, comprising a pipe cavity.

6. An apparatus for connecting a pipe to a wall, the wall having a first stud and a second stud in a fixed spatial relationship, with the pipe disposed between the first and second studs and adjacent the wall, the first and the second studs each having a respective proximate end connected to the wall, the first and the second studs each having a respective distal end, with a first groove positioned adjacent the distal end of the first stud, and a second groove positioned adjacent the distal end of the second stud comprising;

a. a bracket having a first end oppositely disposed a second end, a front surface oppositely disposed a rear surface, and an outer surface oppositely disposed a first flange and a second flange;

b. said first flange comprising a first slot adjacent said first end, extending from said front surface towards said rear surface, adapted to slideably engage the first groove;

c. said second flange comprising a second slot adjacent said second end, extending from said front surface towards said rear surface, adapted to slideably engage the second groove; and d. a pipe cavity with a pipe bearing surface disposed between said first flange and said second flange; whereby, when said bracket is in an installed condition, said first slot mates with the first groove and said second flange mates with the second groove, and the pipe bearing surface is adjacent the pipe to retain the pipe adjacent the wall.

7. The apparatus claimed in claim 6, comprising:

a. said first slot adapted to position the first stud away from said front surface when said bracket is in the installed condition;

b. said second slot adapted to position the second stud away from the front surface when said bracket is in the installed condition;

c. a first fastener adjacent said first end movable between a first open position and a first closed position, wherein in the first closed position said first fastener is disposed between the first stud and said front surface when said bracket is in the installed condition; and d. a second fastener adjacent said second end movable between a second open position and a second closed position, wherein in the second closed position said second fastener is disposed between the second stud and said front surface when said bracket is in the installed condition.

8. The apparatus claimed in claim 7, wherein said first and said second fasteners are locking fasteners.

9. The apparatus claimed in claim 8, wherein said first fastener comprises a moveable first threaded rod, and said second fastener comprises a moveable second threaded rod.

10. A method for retaining a pipe against a wall, wherein the wall has a first stud and a second stud in a fixed spatial relationship, and the first stud and the second stud each have a respective proximate end connected to the wall, and the first stud and the second stud each have a respective distal end, with a first groove positioned adjacent the distal end of the first stud, and a second groove positioned adjacent the distal end of the second stud comprising the steps of:

a. providing a pipe and placing a length of the pipe adjacent the wall between the first and the second studs;

b. providing a bracket having:
1. a first end oppositely disposed a second end, a front surface oppositely disposed a rear surface, and an outer surface oppositely disposed a first flange and a second flange,
2. said first flange adjacent said first end, extending from said front surface towards said rear surface, adapted to slideably engage the first groove,
3. said second flange adjacent said second end, extending from said front surface towards said rear surface, adapted to slideably engage the second groove,
4. a pipe bearing surface disposed between said first flange and said second flange, c. positioning said bracket with said first flange aligned with the first groove, said second flange aligned with the second groove, and said pipe bearing surface adjacent the pipe; and d. moving said bracket to an installed position wherein said first flange engages the first groove and said second flange engages the second groove, and said pipe bearing surface is adjacent the pipe to retain the pipe adjacent the wall.

11. A method as claimed in claim 10, comprising the steps of:

a. providing a bracket with a first moveable fastener adjacent said first end, said fastener being in a first open position and moveable to a first closed position, and a second moveable fastener adjacent said second end, said second fastener being in a second open position and moveable to a second closed position; and b. after the step of moving the bracket to an installed position, moving said first fastener to the first closed position, wherein said first fastener is disposed between the first stud and said outer surface, and moving said second fastener to the second closed position, wherein said second fastener is disposed between the second stud and said outer surface.

12. A method according to claim 11, comprising the step of providing a locking first fastener and a locking second fastener.

13. A method according to claim 11, comprising the step of locking said first fastener in the first closed position and locking said second fastener in the second closed position.

14. A method for replacing a pipe retained against a wall, wherein the pipe is adjacent the wall between a first stud and a second stud, the first stud and the second stud each having a respective proximate end connected to the wall, the first stud and the second stud each having a respective distal end, with a first groove positioned adjacent the distal end of the first stud, and a second groove positioned adjacent the distal end of the second stud, and a restraining bar connected to the first stud and the second stud to retain the pipe adjacent the wall, comprising the steps of:

a. cutting the restraining bar adjacent the first stud and adjacent the second stud, and removing the cut portion of the restraining bracket and pipe;

b. providing a second pipe and placing a length of the second pipe adjacent the wall between the first and the second studs;

c. providing a bracket having:
1. a first end oppositely disposed a second end, a front surface oppositely disposed a rear surface, and an outer surface oppositely disposed a first flange and a second flange;
2. said first flange adjacent said first end, extending from said front surface towards said rear surface, adapted to slideably engage the first groove;
3. said second flange adjacent said second end, extending from said front surface towards said rear surface, adapted to slideably engage the second groove;
4. a pipe bearing surface disposed between said first flange and said second flange;

c. positioning said bracket with said first flange aligned with the first groove, said second flange aligned with the second groove, and said pipe bearing surface adjacent the pipe; and d. moving said bracket to an installed position wherein said first flange engages the first groove and said second flange engages the second groove, and said pipe bearing surface is adjacent the pipe to retain the pipe adjacent the wall.

15. A method as claimed in claim 14, comprising the steps of:

a. providing the bracket with first moveable fastener adjacent said first end, said fastener being in a first open position and moveable to a first closed position, and a second moveable fastener adjacent said second end, said second fastener being in a second open position and moveable to a second closed position; and b. after the step of moving the bracket to the installed position, moving said first fastener to the first closed position, wherein said first fastener is disposed between the first stud and said outer surface, and moving said second fastener to the second closed position, wherein said first fastener is disposed between the second stud and said outer surface.

16. A method according to claim 14, comprising the step of providing a locking first fastener and a locking second fastener.

17. A method according to claim 14, comprising the step of locking said first fastener and locking said second fastener.

* * * * *